[19] United States Patent
Down

[11] 3,963,264
[45] June 15, 1976

[54] DUAL PURPOSE TRAILER TOWING ATTACHMENT

[76] Inventor: Dennis Llewellyn Richard Down, Elwell Farm, Diptford, Totnes, Devon, England

[22] Filed: Jan. 23, 1975

[21] Appl. No.: 543,599

[30] Foreign Application Priority Data
Jan. 23, 1974 United Kingdom............... 3046/74

[52] U.S. Cl. ............................. 280/415 A; 280/504
[51] Int. Cl.² ......................................... B60D 1/02
[58] Field of Search ........ 280/415 R, 415 A, 461 R, 280/511, 515, 504

[56] References Cited
UNITED STATES PATENTS

| 2,189,710 | 2/1940 | Draeger | 280/511 |
| 3,393,924 | 7/1968 | Silver | 280/515 X |
| 3,843,160 | 10/1974 | Frushour | 280/415 A |

Primary Examiner—Philip Goodman
Assistant Examiner—R. Schrecengost
Attorney, Agent, or Firm—Sughrue, Rothwell, Mion, Zinn & Macpeak

[57] ABSTRACT

This invention provides a dual purpose towing attachment capable of accepting tow-bars with eye type fittings and also incorporating a ball to which a socket type fitting can be attached. The attachment has a pair of parallel flat lugs or plates between which a towing eye may be introduced, the upper plate being surmounted by a spherical boss to which a socket type trailer attachment may be fitted, the boss having a through bore which accepts a pin spanning the two parallel lugs for engagement with eye type tow-bars. The upper surface of the pin has a rounded head which when the pin is fully inserted is flush with the spherical surface of the towing boss, so that the towing attachment has an overall compact size.

9 Claims, 2 Drawing Figures

DUAL PURPOSE TRAILER TOWING ATTACHMENT

BACKGROUND OF THE INVENTION

This invention relates to a dual purpose trailer towing attachment.

It is known to adapt a motor vehicle such as an automobile for towing by fitting a rear towing attachment for releasably attaching the tow-bar of a trailer such as a boat trailer, horse box, caravan or other vehicle. There are two types of towing attachment in common use: one features a pair of rearwardly projecting lugs, positioned one above the other with aligned holes therein in which a pin can be engaged. When towing with this type of attachment a towing eye on a trailer tow-bar is located between the lugs and the pin passed through holes in the lugs and through the eye and then locked in position. Another common type of towing attachment consists of a bracket surmounted by an upstanding ball upon which a socket type tow-bar fitting is seated and locked to provide a swivel towing attachment.

To improve the versatility of a towing vehicle it is clearly desirable to provide a dual purpose towing attachment which can be used with trailer draw-bars of the kind fitted either with eye fittings or socket fittings. One known type of dual purpose towing attachment has a pair of rearwardly projecting apertured lugs for receiving a pin engageable with an eye type fitting, one of these lugs being surmounted by a spherical boss for engagement by a socket type fitting Such a known attachment is, however, disadvantageous in practice since the rearward extension of the apertured lugs beyond the spherical boss can interfere with the movement of a tow-bar in the pitching plane relative to the towing attachment when towing on rough terrain.

An object of the present invention is to provide an improved dual purpose trailer towing attachment of compact size.

SUMMARY OF THE INVENTION

The present invention provides a dual purpose towing attachment comprising a support plate provided on one face with two parallel flat lugs which, when the plate is mounted on a towing vehicle, project rearwardly from the plate and are spaced apart one above the other in respective horizontal planes, the upper lug being provided on its upper surface with an upstanding spherical boss upon which a socket of a tow-bar can be seated, a bore extending through the centre of the boss and through the two lugs, and a pin engageable in the bore, the pin having an enlarged head, which is substantially flush with the surface of the boss when the pin is fully inserted in the bore, spanning the space between the two lugs.

Since the bore in the spherical boss passes through both lugs and serves to receive the pin, the need for a rearward extension of the lugs beyond the boss is obviated, so that the towing attachment according to the invention can have a small rearward extension compared with earlier known dual purpose attachments of the type previously mentioned.

Preferably the head of the pin has a rounded end the curvature of which is the same as that of the boss.

The bore preferably has a widened portion adjacent the upper surface of the boss, defining an annular shoulder against which the enlarged head of the pin abuts when the latter is fully inserted in the bore.

A locking element may be provided for engagement in a transverse hole in the lower end of the pin which projects below the lower lug when the pin is fully inserted in the bore. The locking element may be of any convenient known type, preferably with a spring retaining means.

The boss may be formed integrally with or welded to the upper lug. A reinforcing fillet may be provided on the plate, between the two lugs, in the plane of symmetry of the latter.

BRIEF DESCRIPTION OF THE DRAWINGS

A typical practical embodiment of the invention is illustrated, merely by way of example, in the accompanying drawings, wherein.

DETAILED DESCRIPTION OF THE ILLUSTRATED EMBODIMENT

Figure 1:
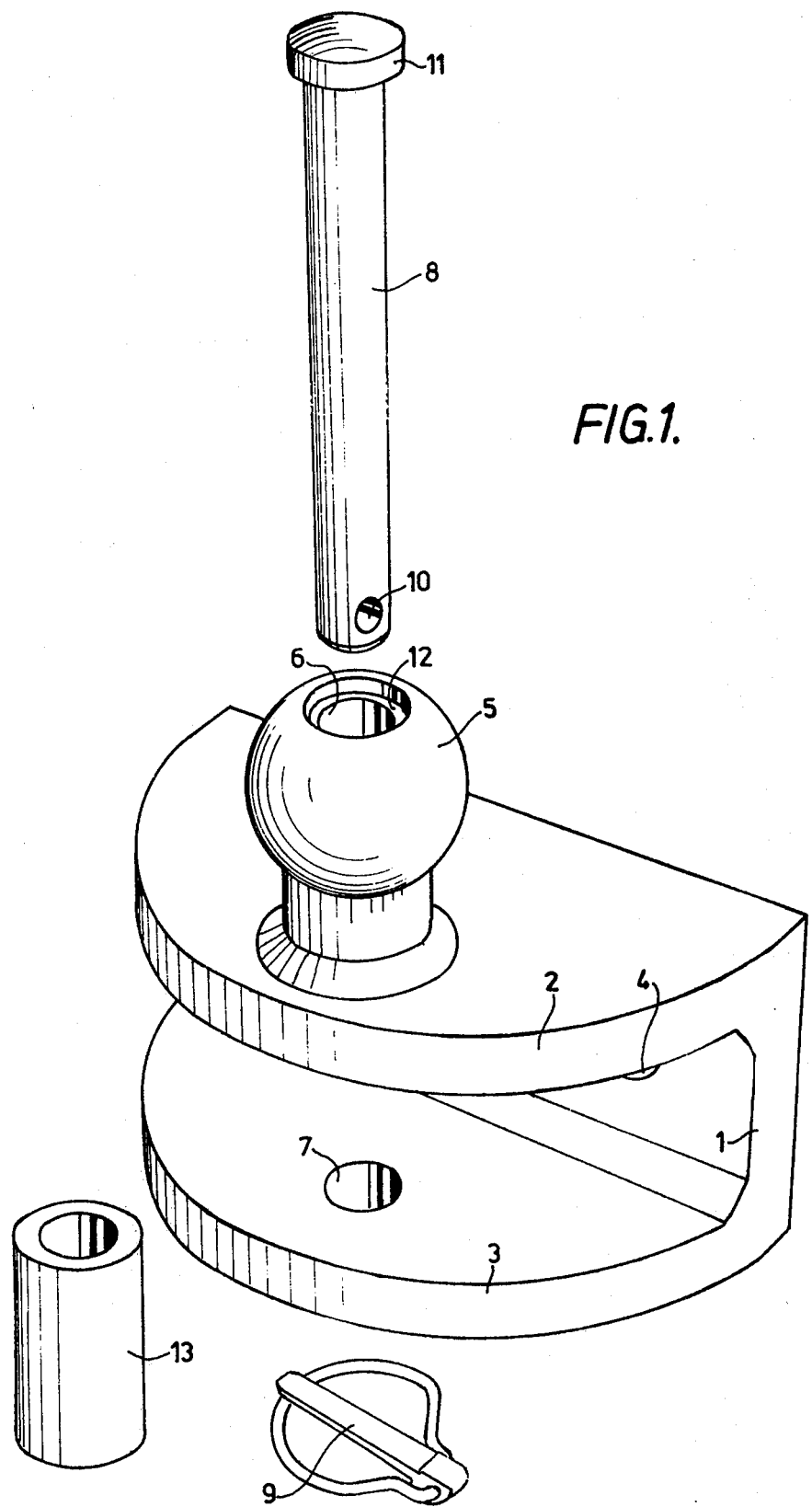
FIG. 1 is a diagrammatic perspective view of a towing attachment according to one embodiment of the invention, with the towing pin shown removed from the attachment for ease of illustration.

Referring to the drawings, a dual purpose trailer towing attachment comprises a mild steel support plate 1 provided on one face with two parallel flat mild steel lugs 2, 3 attached to the plate 1 by welding. The plate 1 is provided with holes 4, one of which is shown in FIG. 1, for receiving fixing bolts (not shown) by means of which the plate 1 may be mounted in a vertical plane at the rear of a towing vehicle so that the two lugs 2, 3 project rearwardly in respective horizontal planes one above the other, as illustrated. The two lugs 2, 3 have identical plan shapes in the form of circular segments with symmetry about a central plane perpendicular to the support plate 1 and to the lugs 2, 3.

Figure 2:
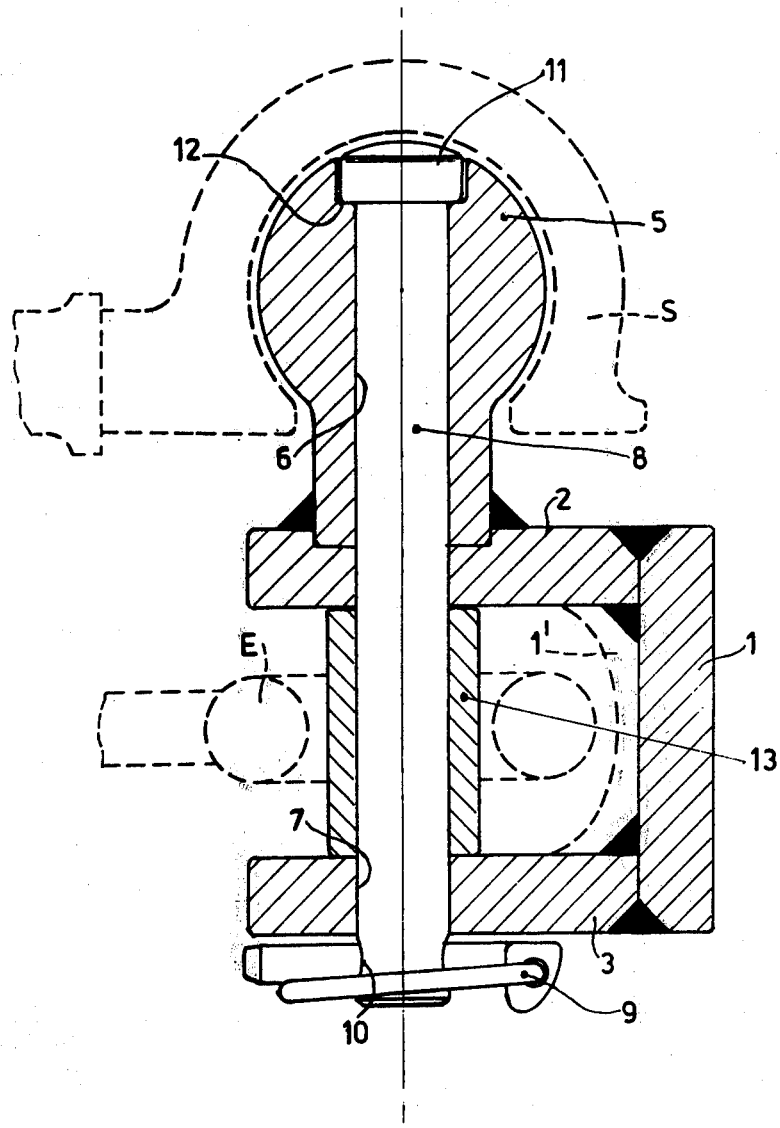
FIG. 2 is a diagrammatic vertical cross-section through the plane of symmetry of the towing attachment shown in FIG. 1.

A reinforcing fillet 1', shown in broken outline in FIG. 2, may be provided on the support plate 1 and extend between the two lugs 2, 3 in the plane of symmetry of the latter.

The upper lug 2 is provided on its upper surface with an upstanding spherical boss 5, attached to the lug 2 by welding, adapted to form a swivel joint with a socket of a towing attachment (not shown) of a trailer tow-bar.

A circular through bore 6 extends through the centre of the boss 5 and through the upper lug 2 on which it is mounted, a continuation of the bore 6 also passing through the lower lug 3 as a circular hole 7. The bore 6, 7 is adapted to receive a high tensile steel cylindrical towing pin 8 the length of which is such that when it is fully inserted in the bore 6, 7 the lower end of the pin 8 projects below the lower lug 3 so that a locking pin 9 can be inserted in a transverse hole 10 in this projecting lower end of the pin 8, in a conventional manner.

The upper end of the pin 8 is formed with an enlarged head 11 which seats on an annular shoulder 12 formed by a counter-bore in the upper end of the spherical boss 5, thereby forming an effective stop upon full insertion of the pin 8 in the bore 6, 7. The upper end surface of the head 11 is rounded and has a radius equal to that of the spherical boss 5, the head 11 being such that when the pin 8 is fully inserted in the bore 6, 7 the upper rounded surface of the head forms in effect a smooth continuation of the spherical surface of the boss 5.

With the pin 8 fully inserted in the bore 6, 7 the spherical boss 5 may be used for the attachment of a spherical socket fitting on a tow-bar, in a manner known per se, as shown in broken outline at S in FIG. 2. It will be noted that with the pin 8 so inserted the traction force exerted on the spherical boss 5 during towing is transmitted both to the upper and the lower lug 3 by the pin 8, giving a greater load distribution over the towing attachment.

With the pin 8 fully inserted in the bore 6, 7 the attachment can, of course, also be used for engagement with a towing eye on a trailer tow-bar, shown in broken outline at E in FIG. 2, located between the two lugs 2, 3. For this purpose a steel sleeve 13 is provided as an optional feature and fits over the portion of the pin 8 which spans the space between the two lugs 2, 3. The external diameter of the sleeve 13 is such that the towing eye can be secured between the lugs with the sleeve 13 interposed between the pin and the eye. Sleeves 13 of different external diameter may be provided for the attachment of trailer towing eyes of different internal diameter.

The lugs 2, 3 may be forged in one piece with the support plate 1, for example by die-casting. Moreover the boss 5 may be cast integrally with the upper lug 2.

I claim:

1. A dual purpose trailer towing attachment comprising:
   a support plate;
   two parallel flat lugs which, when the plate is mounted vertically on a towing vehicle, project rearwardly from the plate and are spaced apart one above the other in respective horizontal planes;
   an upstanding boss welded to the upper lug and projecting from the upper surface thereof, said boss being adapted to receive a socket towing fitting of a tow-bar;
   means defining a bore extending through the centre of the boss and through the two lugs, and
   a pin engageable in the bore, said pin having an enlarged head which is substantially flush with the surface of the boss when the pin is fully inserted in the bore and passes through the two lugs.

2. The towing attachment defined in claim 1, wherein the head of the pin has a rounded end surface the curvature of which is the same as that of the boss.

3. The towing attachment defined in claim 1, wherein the bore has a widened portion adjacent the upper surface of the boss defining an annular shoulder upon which the enlarged head of the pin seats when the pin is fully inserted in the bore.

4. The towing attachment defined in claim 1, including a locking element engageable in a transverse hole in an end portion of the pin which projects below the lower lug when the pin is fully inserted in the bore.

5. The towing attachment defined in claim 1, wherein a reinforcing fillet is provided on the support plate and extends between the two lugs, in the plane of symmetry of the latter.

6. The towing attachment defined in claim 1, including a sleeve which fits over the portion of the pin spanning the space between the two lugs, the sleeve being interposed between the pin and a towing eye in use of the towing attachment.

7. The towing attachment defined in claim 1, wherein each lug has the shape of a circular segment in plan with symmetry about a plane perpendicular to the support plate.

8. A dual purpose trailer towing attachment comprising:
   a support plate;
   two parallel flat lugs which, when the plate is mounted vertically on a towing vehicle, project rearwardly from the plate and are spaced apart one above the other in respective horizontal planes;
   an upstanding boss upstanding from an integral with the upper lug and adapted to receive a socket towing fitting of a tow-bar;
   means defining a bore extending through the centre of the boss and through the two lugs, and
   a pin engageable in the bore, said pin having an enlarged head which is substantially flush with the surface of the boss when the pin is fully inserted in the bore and passes through the two lugs.

9. The towing attachment defined in claim 8, including a sleeve which fits over the portion of the pin spanning the space between the two lugs, the sleeve being interposed between the pin and a towing eye in use of the towing attachment.

* * * * *